United States Patent
Snow

[15] 3,680,709
[45] Aug. 1, 1972

[54] CARTRIDGE TYPE FILTER AND METHOD OF MAKING SAME

[72] Inventor: Charles L. Snow, 2057 Reading Rd., Cincinnati, Ohio 45202

[22] Filed: Nov. 18, 1970

[21] Appl. No.: 90,662

[52] U.S. Cl..................................210/494, 210/496
[51] Int. Cl. ..............................................B01d 27/04
[58] Field of Search......210/493, 494, 496, 507, 484, 210/497.1, 497 H; 55/487, 498, 510, 520, 521

[56] References Cited

UNITED STATES PATENTS

| | | | |
|---|---|---|---|
| 3,543,940 | 12/1970 | Schmidt, Jr.................210/507 X |
| 3,399,516 | 9/1968 | Hough, Jr. et al.........210/496 X |
| 3,415,384 | 12/1968 | Kasten......................210/494 X |
| 3,227,592 | 1/1966 | Coates et al....................55/521 |

FOREIGN PATENTS OR APPLICATIONS 502,000  5/1954  Canada..........................210/494

Primary Examiner—Reuben Friedman
Assistant Examiner—Frederick F. Calvetti
Attorney—Pearce & Schaeperklaus

[57] ABSTRACT

A cartridge type filter having a rigid tubular perforated core and a porous web of spunbonded fibrous resin wound thereon. The density of the wound web is controlled by control of tension on the web during winding. End portions of the winding are fused to be impervious.

2 Claims, 3 Drawing Figures

PATENTED AUG 1 1972
3,680,709
Fig 1
Fig 2
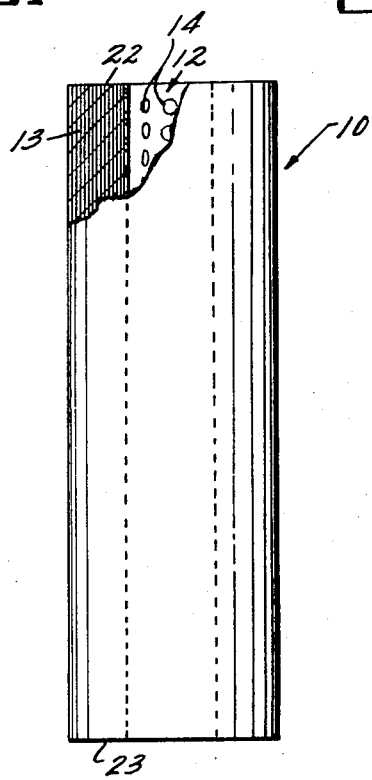
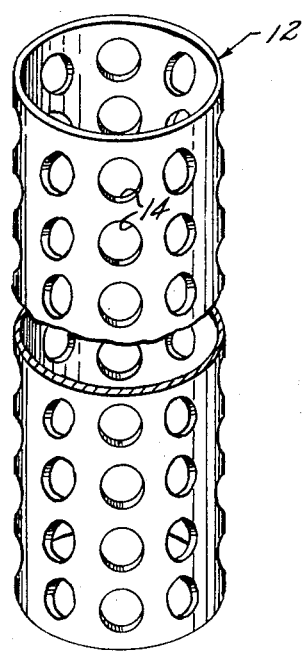
Fig 3
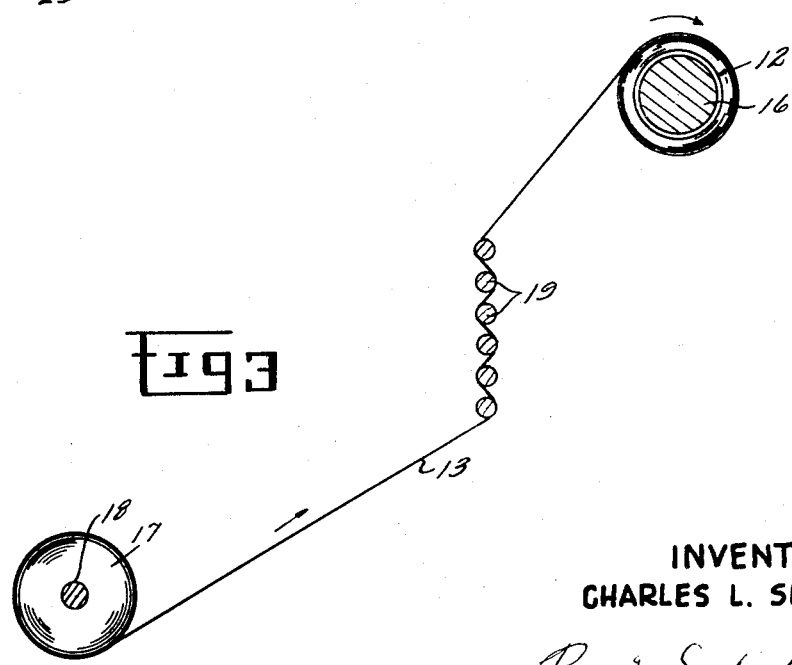
INVENTOR.
CHARLES L. SNOW
By Pearce & Schaeferklaus
ATTORNEYS-

CARTRIDGE TYPE FILTER AND METHOD OF MAKING SAME

This invention relates to an improved cartridge type filter and to a method of making same.

An object of this invention is to provide a cartridge type filter which is capable of extracting fine particles from a liquid.

A further object of this invention is to provide a method of forming a cartridge type filter in which an elongated perforated tubular core carries a porous web of spunbonded fibrous resin wound thereon and in which characteristics of the filter are determined by the tension on the tape during winding.

Briefly, this invention provides a cartridge type filter which includes a rigid tubular core provided with a multitude of perforations through which liquid can pass and a porous tape web wound thereon in a plurality of layers or convolutions. The tape is formed of random arranged synthetic resin fibers which are bonded at fiber junctions. The fibers of the tape are preferably thermoplastic, and end portions of the convolutions of the tape are preferably heated to fuse together and eliminate porosity at ends of the cartridge.

The above and other objects and features of the invention will be apparent to those skilled in the art to which this invention pertains from the following detailed description and the drawing, in which:

FIG. 1 is a view in front elevation of a cartridge type filter constructed in accordance with an embodiment of this invention, a portion thereof being broken away to reveal details of construction;

FIG. 2 is a perspective view of a core of the filter shown in FIG. 1; and

FIG. 3 is a somewhat schematic view partly in side elevation and partly in section showing portions of a machine for forming the filter.

In the following detailed description and the drawing, like reference characters indicate like parts.

In FIG. 1 is shown a cartridge type filter 10, which is constructed in accordance with an embodiment of this invention. The filter 10 includes a core 12 and a winding 13 surrounding the core 12. The core 12 is formed of appropriate rigid material which is unaffected by materials to be filtered through the filter and can be formed of rigid plastic material or of stainless steel or of other material which is unaffected by liquid which passes through the filter. The core is tubular and the wall of the core is provided with a multiplicity of perforations 14 through which the liquid can pass. The winding 13 is formed of spunbonded synthetic resin fiber sheet material in which continuous filament fibers are randomly arranged, highly dispersed, and bonded at the filament junctions. The spunbonded sheet material can be formed of polyester resin or polypropylene resin or nylon resin or other appropriate resin, which is preferably a thermoplastic resin. Use of these specified materials permit construction of a filter element that contains no foreign additives, such as binders or adhesives or bonding agents that could contaminate particular filtrates, or lessen resistance to specific chemicals being filtered.

In the forming of the filter, the core 12 is mounted on an appropriate shaft 16 (FIG. 3). Spunbonded tape in a web of a width equal to the length of the core 12 from a roll 17 of tape mounted on an appropriate shaft 18 is directed around a plurality of elongated parallel stationary spaced tension bars 19, which restrain the tape as it advances toward the core supporting shaft 16. The shaft 16 is turned by appropriate mechanism, not shown, to turn the core 12 in clockwise direction as shown in FIG. 3 to wind the tape on the core 12 in a multiplicity of layers. The degree of tension in the tape is determined by the number of tension bars 19 in the path of the tape. If additional tension bars 19 are added, the tension in the tape is increased, the density of the winding is increased, and the size of particle retained by the filter is reduced. If the number of the tension bars is reduced, the tension on the web is reduced, the density of the winding is reduced, and the resistance to flow of liquid therethrough is reduced. Tension can be made tighter when winding close to the core and then can be gradually reduced toward the outside to give a graduated density for the cartridge construction.

End portions 22 and 23 (FIG. 1) of the winding 13 at ends of the core 12 preferably are heated sufficiently to cause fusing of the filaments at the ends of the filter winding to make the end portions impervious to flow of liquid so that liquid entering the sides of the filter winding of the cartridge passes through the winding and through the perforations into the interior of the core, and the liquid does not escape at ends of the winding.

Spunbonded material is available commercially in a sheet or web having a density of approximately 1 ounce per square yard, and such material is suitable for use in forming cartridge type filters of this invention. In a typical preferred filter having a core provided with an outside diameter of one inch (1"), there can be approximately twenty (20) yards of spunbonded polyester winding in a filter having an outside diameter of two and one-half inches (2½"). Greater or lesser lengths of material can be wound on the core, and good results are obtained with as much as 25 yards or as little as 14 yards wound on a core of the same outside diameter and wound with sufficient tension to provide an equal outer diameter. The preferred typical filter can be ten (10) inches long to fit standard filter holders. However, the filters of this invention can be of differing lengths and can have cores of differing diameter and can be wound to differing outside diameters as required for varying filter applications.

The filter construction and the method illustrated in the drawing and described above can be modified within the spirit and scope of the appended claims.

Having described my invention, what I claim as new and desire to secure by letters patent is:

I claim:

1. A cartridge type filter which comprises a rigid tubular perforated core and a winding thereon including a plurality of convolutions of a fibrous spunbonded thermoplastic resin sheet material surrounding the core, edge portions of the windings being fused together to form impervious end portions on the filter.

2. A method of forming a cartridge type filter which comprises winding an elongated web of fibrous spunbonded thermoplastic resin sheet material on a rigid tubular perforated core while controlling the tension on the web during winding to provide a predetermined density in the wound web and, following winding, heating edge portions of the wound web to fuse the resin fibers along opposite side edges of the web to provide impervious end portions on the filter formed of fused material of the web.

* * * * *